US009609514B2

(12) United States Patent
Mistry et al.

(10) Patent No.: US 9,609,514 B2
(45) Date of Patent: Mar. 28, 2017

(54) SYSTEM AND METHOD FOR SECURING A CONFERENCE BRIDGE FROM EAVESDROPPING

(71) Applicant: Avaya Inc., Santa Clara, CA (US)

(72) Inventors: Pritesh Mistry, Pune (IN); Manjusha Gole, Pune (IN)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 14/606,650

(22) Filed: Jan. 27, 2015

(65) Prior Publication Data
US 2016/0219435 A1 Jul. 28, 2016

(51) Int. Cl.
| H04M 3/42 | (2006.01) |
| H04W 12/06 | (2009.01) |
| H04W 4/08 | (2009.01) |
| H04M 3/56 | (2006.01) |
| H04L 29/06 | (2006.01) |

(52) U.S. Cl.
CPC .......... H04W 12/06 (2013.01); H04L 63/065 (2013.01); H04L 63/0838 (2013.01); H04M 3/565 (2013.01); H04W 4/08 (2013.01); H04L 63/104 (2013.01); H04L 63/18 (2013.01)

(58) Field of Classification Search
CPC ........ H04M 3/56; H04M 3/382; H04M 3/565; H04M 2203/5054
USPC ............ 379/202.01, 201.01, 207.13, 207.11; 455/416
See application file for complete search history.

(56) References Cited

U.S. PATENT DOCUMENTS

| 7,266,188 | B2 | 9/2007 | Carlson |
| 8,243,904 | B2 | 8/2012 | Lingafelt et al. |
| 8,494,142 | B2 | 7/2013 | Lingafelt et al. |
| 8,520,820 | B2 | 8/2013 | Lai |
| 8,635,683 | B2 | 1/2014 | Lingafelt et al. |
| 8,787,874 | B2 | 7/2014 | Gisby et al. |
| 2008/0253546 | A1* | 10/2008 | Chen ...................... H04M 3/56 379/202.01 |

(Continued)

FOREIGN PATENT DOCUMENTS

| CA | 2725496 | 7/2011 |
| CA | 2767573 | 8/2012 |

(Continued)

Primary Examiner — Thjuan K Addy
(74) Attorney, Agent, or Firm — Sheridan Ross P.C.

(57) ABSTRACT

To provide more secure access to a conference call, a request is received from a user to retrieve a one-time conference passcode; the request includes a personal verification code. In one embodiment, the personal verification code is a digital certificate. The personal verification code is validated. In response to the personal verification code being valid, the user is sent the one-time conference passcode. The user then requests to join the conference call by presenting the one-time conference passcode and a participant code. The one-time conference passcode and the participant code are verified. In response to verifying the one-time conference passcode and the participant code, the user is allowed to join the conference call. The user's name is then displayed in a list of conference participants. This overcomes the security problem of not knowing exactly who is participating in the conference call.

20 Claims, 5 Drawing Sheets

(56) References Cited

U.S. PATENT DOCUMENTS

| | | | | |
|---|---|---|---|---|
| 2009/0154707 A1* | 6/2009 | Lee | ............... | H04L 9/0822 380/278 |
| 2011/0164740 A1 | 7/2011 | Gisby et al. | | |
| 2011/0164741 A1 | 7/2011 | Gisby et al. | | |
| 2014/0051383 A1* | 2/2014 | Doerr | ............... | H04W 4/16 455/405 |

FOREIGN PATENT DOCUMENTS

| | | |
|---|---|---|
| EP | 2341689 | 7/2011 |
| EP | 2362598 | 8/2011 |

\* cited by examiner

SYSTEM AND METHOD FOR SECURING A CONFERENCE BRIDGE FROM EAVESDROPPING

TECHNICAL FIELD

The systems and methods disclosed herein relate to conferencing systems and in particular to securing conferencing systems.

BACKGROUND

Current day conferencing solutions provide various options for conferencing participants in a conference call. One solution is to provide a host code for a moderator of the conference call and a participant code for the other participants in the conference call. The host code is known only to the moderator. The moderator logs into the conference call using the host code. Each participant then logs in using the same participant code. In a voice only conference call, the moderator only hears a beep when each participant joins the conference call. The moderator then must ask who joined the conference call.

The problem with this solution is that once a person has gained access to the participant code, the person can join the conference call (e.g., a periodically scheduled call) even when the person was not invited. All the person has to do is know when the meeting is scheduled.

One solution to deal with this problem is to provide a list of caller IDs associated with each caller who has called into the conference call. The list is typically provided to the moderator or via a multi-media display in the conference call. However, this solution still falls short. When callers call in using outside services, such as Skype®, the caller's ID is listed as "unknown." Likewise, if the caller has blocked the use of caller ID, the caller is listed as "unknown." If the system cannot identify who the caller is using caller ID, the identity of the caller is listed by displaying the caller's phone number. In these situations, the caller's identity is still unknown. Without proper identification of the callers, these solutions are not completely secure.

SUMMARY

Systems and methods are provided to solve these and other problems and disadvantages of the prior art. To provide more secure access to a conference call, a request is received from a user to retrieve a one-time conference passcode; the request includes a personal verification code. In one embodiment, the personal verification code is a digital certificate. The personal verification code is validated. In response to the personal verification code being validated, the user is sent the one-time conference passcode. The user then requests to join the conference call by presenting the one-time conference passcode and a participant code. The one-time conference passcode and the participant code are verified. In response to verifying the one-time conference passcode and the participant code, the user is allowed to join the conference call. The user's name is then displayed in a list of conference participants. This overcomes the security problem of not knowing exactly who is participating in the conference call.

DETAILED DESCRIPTION

Figure 1:
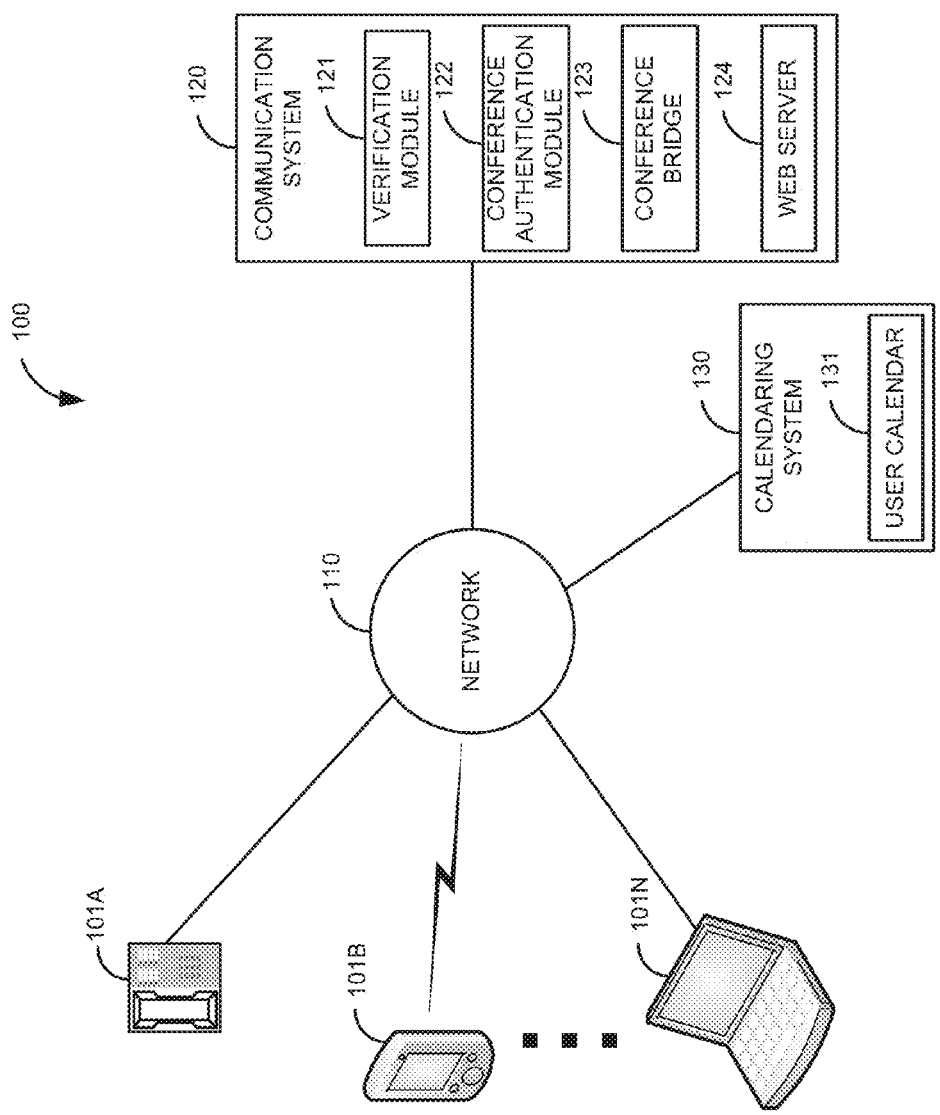
FIG. 1 is a block diagram of a first illustrative system for securing a conference call.

FIG. 1 is a block diagram of a first illustrative 100 system for securing a conference call. The first illustrative system 100 comprises communication endpoints 101A-101N, a network 110, a communication system 120, and a calendaring system 130.

The communication endpoint 101 can be or may include any communication endpoint that can communicate on the network 110, such as a Personal Computer (PC), a telephone, a video phone, a cellular telephone, a Personal Digital Assistant (PDA), a tablet device, a notebook device, a smart phone, and/or the like. As shown in FIG. 1, any number of communication endpoints 101A-101N may be connected to the network 110. In addition, the communication endpoint 101 may be directly connected to the communication system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, and/or the like. Thus, the network 110 is an electronic communication network that allows for sending of messages via packets and/or circuit switched communications.

The communication system 120 can be or may include any hardware with the necessary software to route communications on the network 110, such as a Private Branch Exchange, a central office switch, a router, a server, a proxy server, and/or the like. The communication system 120 further comprises a verification module 121, a conference authentication module 122, a conference bridge 123, and a web server 124.

Although the components of the communication system 121-124 are show as part of the communication system 120. In other embodiments, the elements 121-124 can be included in other systems, such as the communication devices 101A-101N. Alternatively, the elements 121-124 may be used by a trusted entity to further increase the trust relationship.

The verification module 121 can be or may include any hardware/software that can verify a user. The verification module can use a various protocols to verify a user, such as digital certificates, public key certificates, digital certificates provided by a Certificate Authority, encryption protocols, hashing algorithms, biometric information, and/or the like. In one embodiment, the verification module 121 is on a separate server from the communication system 120. In another embodiment, the verification module 121 is distributed between the communication system 120 and a communication endpoint 101. For example, part of the verification module 121 may be included in an application that runs on a smart phone. The conference verification module 121 may use various components to interact with a user, such as an Interactive Voice Response (IVR) system, an interactive web page, an application, and/or the like.

The conference authentication module 122 can be or may include any hardware/software that can authenticate a user into a conference call. In one embodiment, the conference authentication module 122 may be separate from the communication system 120. For example, the conference authentication module 122 and the conference bridge 123 may be on a separate server. The conference authentication module 122 can be distributed between the communication system 120 and a communication endpoint 101. For example, part of the conference authentication module 122 may be included in an application that runs on a smart phone. The conference authentication module 122 may use various components to interact with a user, such as an IVR system, an interactive web page, an application, and/or the like. The conference authentication module 122 can use various metrics to authenticate a conference, such as passwords, biometrics, authentication codes, participant codes, host codes, and/or the like.

The conference bridge 123 can be or may include any hardware/software that can conference two or more users into a conference call, such as a mixer, an audio bridge, a video bridge, a multi-media bridge, an Instant Messaging (IM) bridge, a video server, a Private Branch Exchange, an IM server, and/or the like. The conference bridge 123 can bridge video conference calls, audio conference calls, multi-media conference calls, Instant Messaging conference calls, and/or the like. The conference bridge 123 may be separate from the communication system 120. For example, the conference bridge 123 may reside on a separate server.

The web server 124 can be or may include any hardware/software that can provide web services to a communication endpoint 101. The web server 124 may provide web services for the verification module 121, the conference authentication module 122, and/or the conference bridge 123. For example, a user may receive a multi-media or a video conference call via the web server 124. The user may receive a link to a Uniform Resource Locator (URL) provided by the web server 124/conference authentication module 122 to authenticate to a conference call.

The calendaring system 130 can be or may include any hardware/software that can provide calendaring services to a user, such as Microsoft Outlook®, Google Calendar®, Mozilla Sunbird®, and/or the like. The calendaring system 130 further comprises a user calendar 131. The user calendar 131 is an individual calendar of a particular user. The user defines calendar events in the calendar system 130 for specific conference calls.

The verification module 121 receives a request to retrieve a personal verification code for a user. The personal verification code can be any code that uniquely identifies the user in order to establish the identity of the user. The personal verification code may be created using a hashing algorithm, such as MD5. In one embodiment, the personal verification code is a digital certificate. The personal verification code may be valid for a defined period of time. For example, the personal verification code may be generated when the user starts employment at a company and become invalid when the user's employment is terminated. Alternatively, the personal verification code may be valid for a specific time period, such as for two years.

After receiving the request to retrieve the personal verification code, the verification module 121 generates the personal verification code and sends the personal verification code to the user. For example, the personal verification code may be a unique code generated by the verification module 121 using the MD5 hashing algorithm. In another embodiment, the personal verification code may be a digital certificate generated by the verification module 121 or a Certificate Authority, such a VeriSign®.

At some point in time before a conference call, a request is received from the user, at the verification module 121, to retrieve a one-time conference passcode for the user. The request includes the personal verification code. The verification module 121 determines if the personal verification code is valid. The verification module 121 can determine if the personal verification code is valid in various ways. For example, the verification module 121 can determine that the personal verification code is valid by comparing the personal verification code to a list of personal verification codes. If the personal verification code is valid, the verification module generates the one-time conference passcode (or takes the one-time conference passcode from a pool of one-time conference passcodes). The verification module 121 sends the one-time conference passcode to the user. In some embodiments, the one-time conference passcode may only be valid for specific types of conference calls. For example, the one-time conference passcode may only be valid for IM and/or multi-media conference calls.

The conference authentication module 122 receives a request from the user to join the conference call. The request to join the conference call includes the one-time conference passcode for the user and a participant code. For example, the user calls a defined number for the conference call. The user, via an IVR system, enters the one-time conference passcode and the participant code (via Dual Tone Multi-Frequency DTMF signaling) when prompted by the IVR system. The conference authentication module 122 verifies that the one-time conference passcode for the user is valid. The conference authentication module 122 also verifies that the participant code is valid. In response to the one-time conference passcode and the participant code being valid, the conference bridge 123 joins the user to the conference call.

In response to verifying the one-time conference passcode and the participant code, the conference bridge 123 updates a list of conference participants to include the user. The conference bridge 123 sends the updated list of conference participants to one or more of the conference participants. For example, the conference bridge 123, updates the list of conference participants in a web page on the web server 124 that is provided to each conference participant. Alternatively, the web server may only provide the list to a moderator of the conference call.

In one embodiment, the system automatically associates the user's name in the list of conference participants with the telephone number, address, identifier, and/or the like of the calling communication endpoint 101. For example, if the user called from telephone number 303-538-1234, the user's name would be associated with the telephone number 303-538-1234. If the user was calling from a communication endpoint 101 that was "unknown", the user's name would be associated with the unknown communication endpoint 101 in the list of conference participants.

Figure 2:
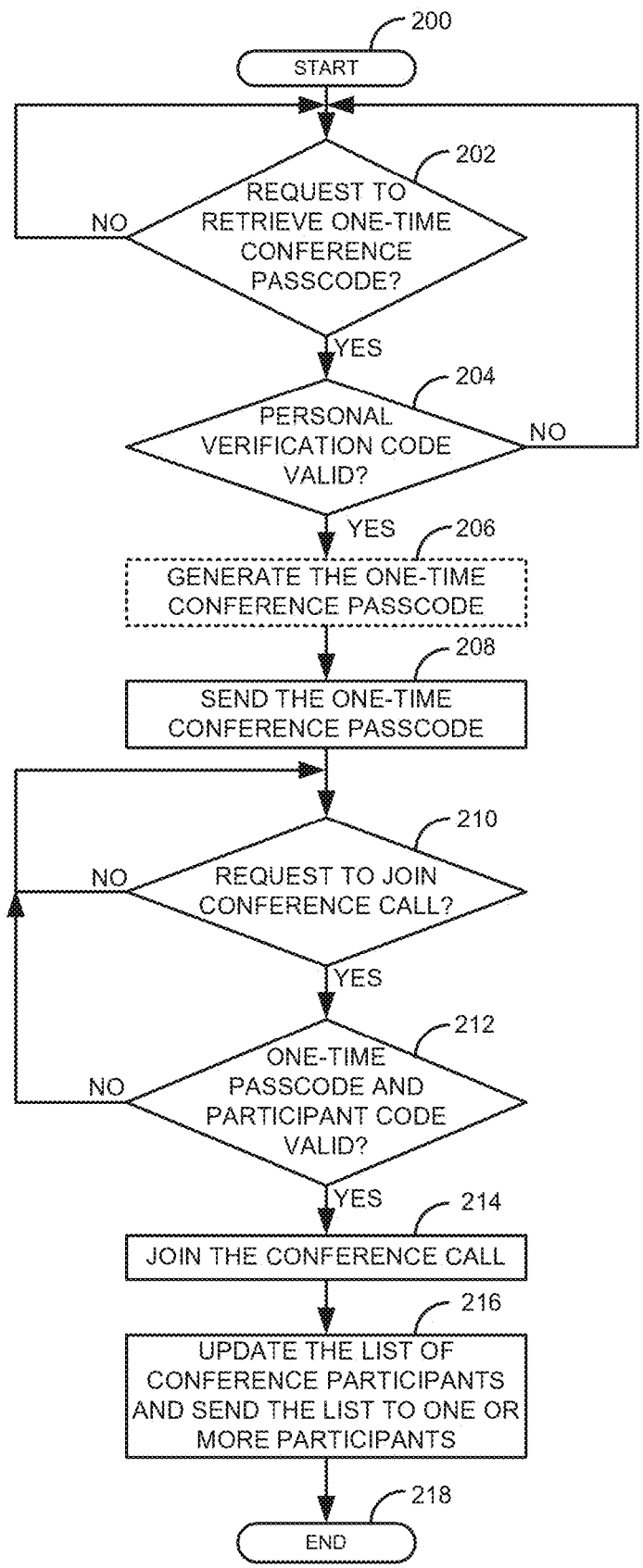
FIG. 2 is a flow diagram of a process for securing a conference call.

FIG. 2 is a flow diagram of a process for securing a conference call. Illustratively, the communication endpoints 101A-101N, the communication system 120, the verification module 121, the conference authentication module 122, the conference bridge 123, and the calendaring system 130 are stored-program-controlled entities, such as a computer or processor, which performs the method of FIGS. 2-5 and the processes described herein by executing program instructions stored in a non-transient computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The process waits to receive a request to retrieve a one-time conference passcode for the user in step 202. If the request has not been received in step 202, the process repeats step 202. If a request to retrieve the one-time conference passcode has been received in step 202, the process determines, in step 204, if a personal verification code supplied as part of the request to retrieve the one-time conference code is valid. If the personal verification code is not valid in step 204, the process goes to step 202. Otherwise, if the personal verification code is valid in step 204, the process optionally generates the one-time conference passcode in step 206. Alternatively, the process may have already generated or received one or more one-time conference passcodes, thus making step 206 optional. The process sends the one-time conference passcode to the user in step 208.

The process (which may be a completely different process/thread from steps 200-208) waits to receive a request to join the conference call in step 210. If a request to join the conference call has not been received in step 210, the process repeats step 210. Otherwise, if a request to join the conference call (which includes the one-time conference passcode and a participant code) has been received in step 210, the process verifies the one-time conference passcode for the user and the participant code in step 212. If either the one-time conference passcode or the participant code is invalid, the process goes to step 210.

In one embodiment, the one-time conference passcode may have a defined life span. For example, the one-time conference pass code may only be valid until the end of the conference call. The process can determine from the user's calendar (or the moderator's calendar) that the conference call ends at 2:00 PM on Friday Dec. 13, 2014. After the 2:00 PM Friday Dec. 13, 2014 time period has expired, the one-time conference passcode becomes invalid.

Otherwise, if the one-time conference passcode and the participant code are valid, the user is joined to the conference call (assuming the conference call is in progress) in step 214. In one embodiment, the user is joined after the moderator joins. The process updates a list of conference participants and sends the updated list of conference participants to one or more users of the conference call in step 216. As discussed previously, in some embodiments, the list of conference participants is also associated with the calling communication endpoint's telephone number, address, identifier, and/or the like. Although not shown the process can remove conference participants from the list when the conference participants leave the conference call. The process then ends in step 218.

Figure 3:
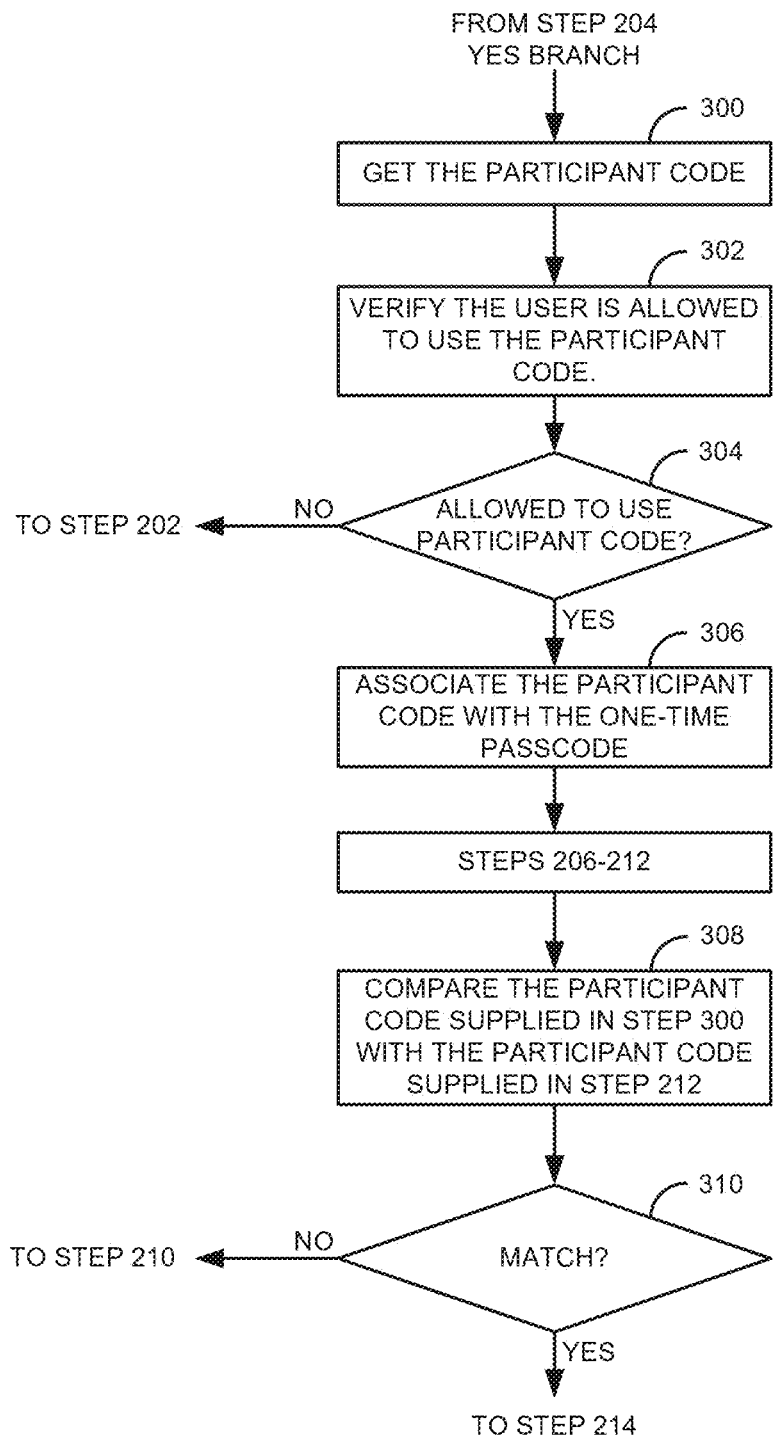
FIG. 3 is a flow diagram of a process for further securing a conference call using a participant code.

FIG. 3 is a flow diagram of a process for further securing a conference call using a participant code. The process in FIG. 3 goes between the step 204-206 and between steps 212-210/214. After determining that the personal verification code is valid in step 204, the process gets the participant code associated with the conference call in step 300. The process verifies that the user is allowed to use the participant code in step 302. The process can verify that the user is allowed to user the participant code in various ways, such as, by comparing the participant code to a defined list of participant codes. In one embodiment, the process uses the calendaring system 130 (i.e., of the user calendar 131 of the moderator) to determine if the user was invited to the conference call by the moderator (or another conference call) and is therefore allowed to use the participant code. If the user is not allowed to use the participant code in step 304, the process goes to step 202.

Otherwise, if the user is allowed to use the participant code in step 304. The process associates the participant code with the one-time passcode in step 306. The process completes the step 206-212 as previously described. Upon determining that the one-time conference passcode and the participant code are valid in step 212, the process, in step 308, compares the participant code supplied in step 300 with the participant code supplied in step 212. If the participant codes do not match in step 310, the process goes to step 210. Otherwise, if the participant codes match, the process goes to step 214 where the user is joined to the conference call.

By comparing the two participant codes, a higher level of security is possible. For example, when the user provides the participant code in step 300, the system could verify that the user is authorized to use a specific participant code and reject the user if an unauthorized participant code is provided. Similarly, if the user provides a valid participant code in step 300, but tries to use the one-time conference passcode by providing a different participant code (in an attempt to join a different conference call), the process would reject the attempted access to the different conference call because the two participant codes do not match.

Figure 4:
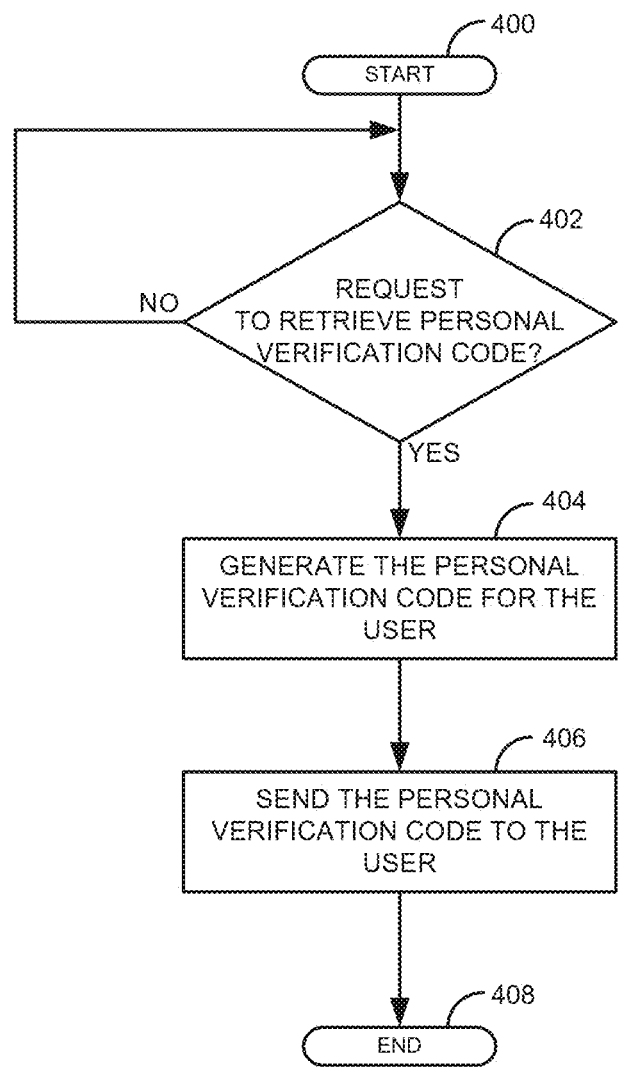
FIG. 4 is a flow diagram of a process for retrieving a personal verification code.

FIG. 4 is a flow diagram of a process for retrieving a personal verification code. The process starts in step 400. The process waits to receive a request to retrieve a personal verification code in step 402. If a request to retrieve the personal verification code in step 402 has not been received, the process repeats step 402. Otherwise, if the request to retrieve the personal verification code is received in step 402, the process generates the personal verification code for the user in step 404. The process sends the personal verification code to the user in step 406. The process ends in step 408.

Figure 5:
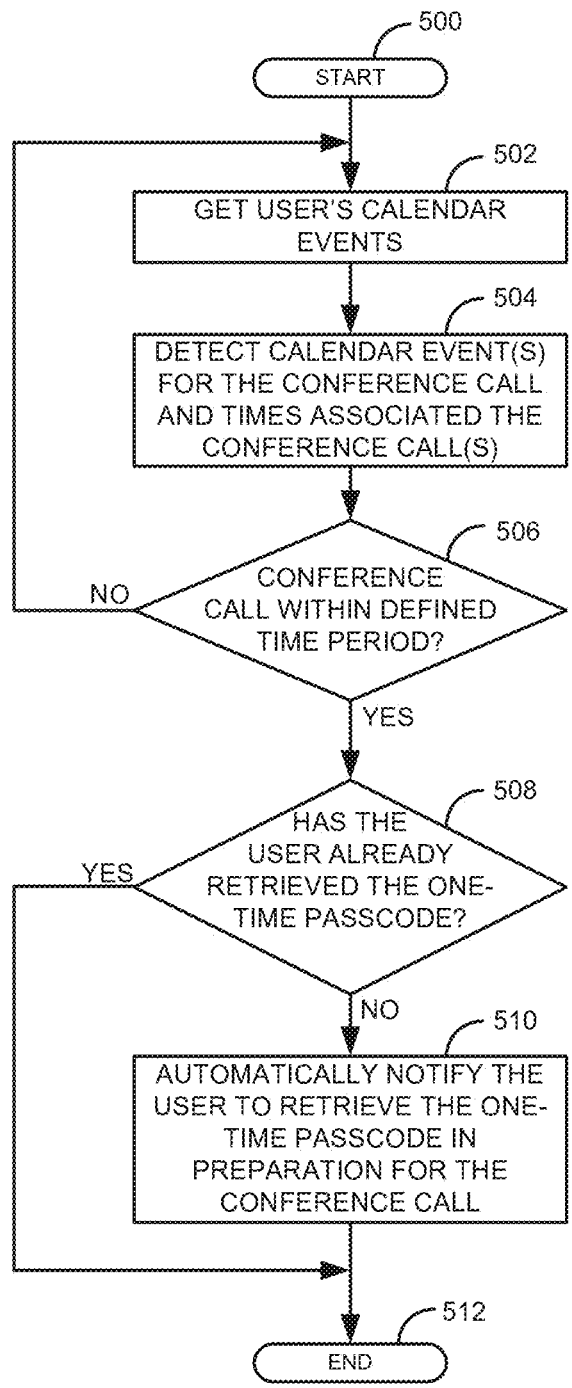
FIG. 5 is a flow diagram of a process for notifying a user to retrieve a one-time conference passcode for an upcoming conference call.

FIG. 5 is a flow diagram of a process for notifying a user to retrieve a one-time conference passcode for an upcoming conference call. The process starts in step 500. The process gets the user's calendar events in step 502. The process detects a calendar event(s) for a conference call and times associated with the conference call(s) in step 504. The calendaring system 130 can scan the user's calendar 131 to detect which calendar events are for conference calls that require the one-time conference passcode. The calendaring system 130 can scan a particular calendar event for information that may indicate that the calendar event is associated with a conference call. For example, the calendaring system 130 can determine that the calendar event is for a conference call if the calendar event has a participant code included in the invite for the conference call. Alternatively, (or in addition to) the calendaring system 130 can determine that the calendar event is for a conference call based on the text of the invite.

The process determines if the time associated with the conference call is within a defined time period in step 506. For example, the user may setup a rule that the user wants to be notified five minutes before the conference call. If the conference call is not within the defined time period in step 506, the process goes to step 502. Otherwise, if the conference call is within the time period in step 506, the process determines if the user has already retrieved the one-time passcode for the conference call in step 508. If the user has already retrieved the one-time conference code in step 508, the process ends in step 512. Otherwise, if the user has not already retrieved the one-time conference code in step 508, the process automatically notifies the user to retrieve the one-time passcode in preparation for the conference call.

To illustrate, consider the following example. The user has defined a rule to be notified two minutes before the conference call. The process scans the user's calendar 131 and detects a conference call schedule at 2:00 PM. The process determines that the calendar event is a conference call because the calendar event includes a participant code. At 1:58 PM, the process determines that the conference call is within the defined time period. The process determines that the user has not retrieved the one-time conference passcode. The process automatically notifies the user, via the user's smart phone (based on a downloaded application), to retrieve the one-time conference passcode for the conference call. In this example, the process could pre-populate the participant code and personal verification code (retrieved previously from the application). The user can then easily retrieve the one-time conference access code and join the conference call in a secure manner.

In one embodiment, the one-time conference passcode can be automatically generated (based on the user's personal verification code being stored in the calendaring system 130). The calendaring system 130 sends the one-time conference passcode as part of the meeting invite along with the participant code. In this example, all the user has to do is to view the invite for the conference call and provide the one-time conference passcode and the participant code from the meeting invite.

Although the above processes are described based on a single user at each communication endpoint 101, the above processes can also work in situations where there are multiple users at a communication endpoint. For example, a conference room may be equipped with cameras. Based on facial recognition, the conference room communication endpoint 101 can ask each person in the conference room to provide their one-time conference passcode. The list of participants would then show the multiple users and their names at the conference room communication endpoint 101.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
a verification module, executed by one or more processors, that receives a request to retrieve a user-specific one-time conference passcode for a user, wherein the request to retrieve the user-specific one-time conference passcode for the user includes a personal verification code, determines that the personal verification code is valid, and sends the user-specific one-time conference passcode to a communication endpoint of the user in response determining that the personal verification code is valid; and
a conference authentication module, executed by the one or more processors, that receives a request to join a conference call, wherein the request to join the conference call includes the user-specific one-time conference passcode for the user and a participant code, and verifies the user-specific one-time conference passcode for the user and the participant code,
wherein the user-specific one-time conference passcode for the user is unique to the user for the conference call and is not valid for other participants to the conference call, and further wherein the personal verification code comprises a digital certificate.

2. The system of claim 1, further comprising a conference bridge, executed by the one or more processors, that joins the communication endpoint of the user into the conference call in response to verifying the user-specific one-time conference passcode for the user and the participant code, wherein the request to retrieve the user-specific one-time conference passcode for the user also includes the participant code and wherein the conference authentication module compares the participant code supplied in the request to retrieve the user-specific one-time conference passcode for the user with the participant code supplied in the request to join the conference call.

3. The system of claim 2, wherein:
the conference authentication module determines if the participant code supplied in the request to retrieve the user-specific one-time conference passcode for the user is the same as the participant code supplied in the request to join the conference call; and
the conference bridge joins the communication endpoint of the user to the conference call if the participant code supplied in the request to retrieve the user-specific one-time conference passcode matches the participant code supplied in the request to join the conference call.

4. The system of claim 2, wherein the verification module receives a request to retrieve the personal verification code for the user, generates the personal verification code for the user, and sends the personal verification code to the communication endpoint of the user.

5. The system of claim 2, wherein the conference bridge updates a list of conference participants to include the user and sends the updated list of conference participants to a communication endpoint of one or more conference participants in response to verifying the user-specific one-time conference passcode for the user and the participant code.

6. The system of claim 2, wherein the verification module generates the user-specific one-time conference passcode in response to receiving the request to retrieve the user-specific one-time conference passcode for the user.

7. The system of claim 2, further comprising:
a calendaring system that detects a calendar event in a calendar of the user that identifies a time associated with the conference call, determines if the time associated with the conference call is within a defined time period, and automatically notifies the user to retrieve the user-specific one-time conference passcode in preparation for the conference call in response to determining that the time associated with the conference call is within the defined time period.

8. The system of claim 7, wherein the calendaring system determines if the user has already retrieved the user-specific one-time conference passcode in preparation for the conference call, and does not notify the user to retrieve the user-specific one-time conference passcode in response to determining that the user has already retrieved the user-specific one-time conference passcode in preparation for the conference call.

9. A method comprising:
receiving, by a processor, a request to retrieve a user-specific one-time conference passcode for a user, wherein the request to retrieve the user-specific one-time conference passcode for the user includes a personal verification code;
determining, by the processor, that the personal verification code is valid;
in response to determining that the personal verification code is valid, sending, by the processor, the user-specific one-time conference passcode to a communication endpoint of the user;
receiving, by the processor, a request to join a conference call, wherein the request to join the conference call includes the user-specific one-time conference passcode for the user and a participant code;
verifying, by the processor, the user-specific one-time conference passcode for the user and the participant code; and
in response to verifying the user-specific one-time conference passcode for the user and the participant code, allowing, by the processor, the communication endpoint of the user to join into the conference call,
wherein the user-specific one-time conference passcode for the user is unique to the user for the conference call and is not valid for other participants to the conference call.

10. The method of claim 9, wherein the request to retrieve the user-specific one-time conference passcode for the user also includes the participant code and further comprising comparing the participant code supplied in the request to retrieve the user-specific one-time conference passcode for the user with the participant code supplied in the request to join the conference call.

11. The method of claim 10, wherein verifying the one-time conference passcode for the user further comprises:
determining if the participant code supplied in the request to retrieve the user-specific one-time conference passcode for the user is the same as the participant code supplied in the request to join the conference call; and
if the participant code supplied in the request to retrieve the user-specific one-time conference passcode matches the participant code supplied in the request to join the conference call, joining the communication endpoint of the user to the conference call.

12. The method of claim 9, further comprising:
receiving a request to retrieve the personal verification code for the user;
generating the personal verification code for the user; and
sending the personal verification code to the communication endpoint of the user.

13. The method of claim 12, wherein the personal verification code is a digital certificate of the user.

14. The method of claim 9, further comprising:
in response to verifying the user-specific one-time conference passcode for the user and the participant code, updating a list of conference participants to include the user and sending the updated list of conference participants to a communication endpoint of one or more conference participants.

15. The method of claim 9, further comprising:
in response to receiving the request to retrieve the user-specific one-time conference passcode for the user, generating the user-specific one-time conference passcode.

16. The method of claim 9, further comprising:
detecting a calendar event in a calendar of the user that identifies a time associated with the conference call;
determining if the time associated with the conference call is within a defined time period;
in response to determining that the time associated with the conference call is within the defined time period, automatically notifying the user to retrieve the user-specific one-time conference passcode in preparation for the conference call.

17. The method of claim 16, wherein determining if the time period associated with the conference call is within the time period further comprises:
determining if the user has already retrieved the user-specific one-time conference passcode in preparation for the conference call; and
in response to determining that the user has already retrieved the user-specific one-time conference passcode in preparation for the conference call, not notifying the user to retrieve the user-specific one-time conference passcode.

18. The method of claim 9, wherein the user-specific one-time conference passcode is only valid for a specific type of conference call.

19. The method of claim 9, wherein the user-specific one-time conference passcode is automatically generated based on sending an invite for the conference call, and wherein the user-specific one-time conference passcode is included in the invite for the conference call.

20. A conferencing system comprising:
a processor;
a network interface; and
a non-transitory computer readable medium having stored thereon instructions for execution by the processor, the instructions, when executed, causing the processor to:
receive a request to retrieve a user-specific one-time conference passcode for a user, wherein the request to retrieve the user-specific one-time conference passcode for the user includes a personal verification code;
to determine that the personal verification code is valid;
in response to determining that the personal verification code is valid, send the user-specific one-time conference passcode to a communication endpoint of the user;
receive a request to join a conference call, wherein the request to join the conference call includes the user-specific one-time conference passcode for the user and a participant code; and
verify the user-specific one-time conference passcode for the user and the participant code so as to enable the communication endpoint of the user to join into the conference call,
wherein the user-specific one-time conference passcode for the user is unique to the user for the conference call and is not valid for other participants to the conference call.

* * * * *

UNITED STATES PATENT AND TRADEMARK OFFICE
CERTIFICATE OF CORRECTION

PATENT NO. : 9,609,514 B2  Page 1 of 1
APPLICATION NO. : 14/606650
DATED : March 28, 2017
INVENTOR(S) : Pritesh Mistry and Manjusha Gole It is certified that error appears in the above-identified patent and that said Letters Patent is hereby corrected as shown below:

At Column 10, Line 45, please delete "to" therein.

Signed and Sealed this
Sixth Day of June, 2017

Michelle K. Lee
*Director of the United States Patent and Trademark Office*